United States Patent [19]

Hollingsworth, III et al.

[11] Patent Number: 4,879,849
[45] Date of Patent: Nov. 14, 1989

[54] POINT-OF-VIEW MOTION SIMULATOR SYSTEM

[75] Inventors: Fred Hollingsworth, III; Julian G. Angus, both of Sarasota, Fla.

[73] Assignee: Omni Films International, Inc., Sarasota, Fla.

[21] Appl. No.: 116,924

[22] Filed: Nov. 4, 1987

[51] Int. Cl.⁴ ............................................. A63G 31/16
[52] U.S. Cl. ............................................. 52/10; 52/6; 272/18
[58] Field of Search ................. 52/8, 6, 10, 1; 272/18, 272/17

[56] References Cited

U.S. PATENT DOCUMENTS

| | | | |
|---|---|---|---|
| 2,719,715 | 10/1955 | Leahan | 272/18 |
| 3,469,837 | 9/1969 | Heilig | 52/8 |
| 3,865,430 | 2/1975 | Tanus | 272/18 |
| 4,066,256 | 1/1978 | Trumball . | |
| 4,478,407 | 10/1984 | Manabe | 272/18 |
| 4,641,470 | 7/1984 | Astroth et al. . | |
| 4,642,945 | 2/1987 | Browning et al. . | |
| 4,752,065 | 6/1988 | Trunbull | 272/18 |

OTHER PUBLICATIONS

WO 8703816 to Intamin Inc. published Jul. 2, 1987, PCT.

Primary Examiner—John E. Murtagh
Attorney, Agent, or Firm—Mason, Fenwick & Lawrence

[57] ABSTRACT

The motion simulation system of the present invention is basically comprised of three coordinated components or sub-systems. The first sub-system consists of mechanical structure in the form of seats, rods, bearings and hydraulic cylinders employed to mechanically convey eight directions of motion to a participant occupying one of the seats. The second sub-system is found in a hydraulic circuit used to convert electrical signals from a digital controller into hydraulic motion signals for the mechanical system. Finally, the last component of the motion simulator is the electrical circuitry which incorporates a projector for projecting a moving image on the screen coupled with appropriate analog and digital circuitry in order to produce a series of motion signals used to individually move the seats in directions which would correspond to the motion taking plate in the point-of-view film being displayed on the screen.

15 Claims, 8 Drawing Sheets

POINT-OF-VIEW MOTION SIMULATOR SYSTEM

FIELD OF THE INVENTION

The present invention relates to motion simulators, in general, and to a motion simulator which allows seated participants to experience eight directions of movement as they watch a point-of-view film shown on a large screen, in particular.

BACKGROUND OF THE INVENTION

Motion simulation of one type or another has been known for some time. Typically, the goal of motion simulation is to place an individual in an environment where the sensation of actual experiences is artificially recreated. The most prominent use of motion simulation is in the area of flight simulators by which pilots learn the complex procedures necessary for the flying of modern aircraft, without leaving the ground or putting themselves, their instructors or their aircraft at risk. When the pilot is in the cockpit or flight deck of the simulator he flies an exact replica of the controls and instruments of a real aircraft and the precise details of the terrain over which he is flying are displayed ahead of him.

Other areas where motion simulation systems are employed are entertainment and education. In particular, motion simulators are used at high traffic locations such as exhibitions, world's fairs, trade conventions, theme parks and science museums in order to place participants in a situation where they will experience some degree of movement as they watch a point-of-view film shown on a large screen or series of screens. Typically, the participant is seated in an auditorium setting. The motions experienced by the participants are synchronized with the actions taking place in the motion picture.

In some prior art motion simulation systems, a vacant auditorium is filled with rows of seats on a platform which is capable of moving in several directions through a standard hydraulically controlled platform of the type used in some flight simulators. A predetermined number of seats are supported on each platform. The platforms, in turn, are arranged in rows. Typically, among other things, these platforms cannot produce side-to-side motion. Further, because each seat in a group of seats is not independently controlled when a platform tilts, the people occupying seats at one end of the platform swing in a large arc and the people occupying seats in the center of the platform rotate very little. Further, a participant in a prior art motion simulation system used for amusement or education does not receive natural "motion cues" so that the simulated motion does not seem natural. This is caused because the human body is extremely sensitive to changes of speed or direction and, thus, it is essential to provide a participant with motion cues in the simulator which duplicate reality.

There are a number of systems for adding realism to a visual display. These systems are found not only in flight simulation, which has been discussed hereinbefore, but in amusement systems, such as attractions, video games and the like. By way of example, U.S. Pat. No. 4,066,256 (Trumbull) discloses a compact amusement ride in the form of a small theater which creates an illusion for the passengers that they are seated in a rapidly maneuvering vehicle by applying forces to the passenger in synchronism with the display of a motion picture image. The system employs a 3-point hydraulic arrangement to move the entire theater and, thus, depending on where an individual is seated, certain of the motions will be accentuated while others will be diminished. There is no provision for providing a truly realistic simulation that is precisely the same for each individual within the theater.

U.S. Pat. No. 4,461,470 (Astroth et al) relates to a video game which employs a tiltable platform that supports a chair in spaced relation to a console that has a video screen. The system uses a rudimentary arrangement of cables, drums and motors to tilt the platform while views are being displayed on the video screen.

U.S. Pat. No. 3,469,837 (Heilig) relates to an experience theater where an individual is subjected to not only visual images, but a total sensual experience including temperature, smell and movement. With regard to the movement, an individual seat is caused to move in a rudimentary fashion.

Finally, U.S. Pat. No. 4,642,945 (Browning et al) shows an entertainment structure intended to be a cinematic auditorium. The structure includes a horizontally disposed floor or deck and support plate on which seating for members of an audience is arrangable and support means on which the support plate is rotatably mounted. Provision is made for tilting the support plate. However, no provision is made for creating an individual motion of the seats in order to enhance the illusion of reality.

Thus, there is a need for a motion simulator of the type which is commonly found in an entertainment or educational setting where a participant is seated in an auditorium and which employs eight degrees of motion that are synchronized in order to enhance the illusion of reality in the mind of the participant as he/she watches a point-of-view film. The present invention is directed toward filling that need.

SUMMARY OF THE INVENTION

The present invention is directed to an entertainment motion simulator which allows participants to experience realistic movement sensations as they watch a point-of-view film shown on a screen. Basically, the invention includes a theater made up of a plurality of elongated motion simulation platforms arranged one behind the other. The platforms, which are at increasing heights as viewed from the front of the theater, each support ten seats. In a preferred embodiment, the screen is made up of a plurality of perforated aluminum sections, joined together on a frame to form a spherical viewing surface. At the back end of the theater is a projection booth which houses a projection system for projecting a motion picture on the screen while at the same time initiating control of the movement of the seats. Positioned about the theater are several speakers which receive their sound from the soundtracks of the motion picture. In a preferred embodiment, the projector has six soundtracks and five of them are used to power various speakers in order to simulate auditory reality. The sixth soundtrack is used to present a synchronization signal at the start of the motion picture in order to activate a servo-control system for causing the seats to move in eight directions in accordance with the action taking place on the screen in order to create the illusion of reality in the mind of the participant or occupant of the seat.

The motion simulation system of the present invention is basically comprised of three coordinated components or sub-systems. The first sub-system consists of mechanical structure in the form of seats, rods, bearings and hydraulic cylinders in order to mechanically convey eight directions of motion to a participant occupying one of the seats. The second sub-system is found in a hydraulic circuit used to convert electrical signals from a digital control system into hydraulic motion signals for the mechanical system. Finally, the last component of the motion simulator is the electrical circuitry which incorporates a projector for projecting a moving image on the screen coupled with appropriate analog and digital circuitry in order to produce a series of motion signals used to individually move the seats in directions which would correspond to the motion taking place in the point-of-view film being displayed on the screen.

The mechanical structure begins with a permanently secured base. Positioned at both ends of the base are vertically oriented base rails which include nylon guide panels secured to a guide rail.

Horizontally disposed between each vertically oriented base rail is an elongated platform. Each end of the platform terminates in a guide portion that contains guide roller members. Positioned for rotation within the end guide is a vertically oriented wheel rotatably mounted on a horizontally disposed axis. The use of wheels and roller members at both ends of the platform insures smooth vertical motion of the platform in an up-and-down direction relative to the stationary base.

Positioned underneath and at both ends of the platform are a pair of vertically oriented hydraulic cylinders. These cylinders are activated in unison so that their pistons, respectively, move the same vertical distance in order to precisely raise and lower the platform. The top of the platform defines an elongated planar surface to which is secured in spaced relationship two vertically disposed bearing holders. The bearing holders are spaced from each other a sufficient distance to comfortably receive between them a predetermined number of seats. In one embodiment, there are two seats located between the bearing holders. The bearing is of generally circular cross-section and movably receives an elongated main tube.

One end of the main tube terminates in an axial end plate that contains a coupling projection to which is secured the piston end of a hydraulic cylinder. The cylinder is secured to the upper surface in such a way that the longitudinal axis of the piston and cylinder are coterminus with the longitudinal axis of the main tube.

Secured to the rearward face of the platform is a vertically oriented gusset which supports a hydraulic cylinder. Secured to the outer surface of main tube near its center are a pair of radially outwardly projecting rod holders. Each of the rod holders receives an elongated rod which is generally parallel to the surface of the main tube and which is secured against movement in the holders. Positioned between the holders is a pivotally mounted coupling. The free end of the coupling is connected to a stabilizer rod to prevent sideward motion of the coupling and piston. As the piston rod moves in a generally vertical direction up-and-down, the main tube rotates about its longitudinal axis within a prescribed range.

A pair of seat mounting projections emanate from the surface of the main tube in a axial direction. Each of the projections holds a seat support base in an orientation generally perpendicular to the surface of tube. Each seat support base includes three downwardly extending generally planar sections which each contain apertures for receiving a pin in order to movably mount the seat base and its seat to one of the supports. An opening is defined in the main tube that allows one of the sections of the seat support base to extend into the main tube.

Secured within the main tube is a longitudinally extending hydraulic cylinder having a movable piston. Secured to the end of the piston are a series of rods which are attached to the distal end of each seat base. In this way, activation of the hydraulic cylinder causes the piston to move in-and-out and thus displace the rods in a longitudinal direction to-and-fro within the main tube.

A hydraulic circuit powers the various hydraulic cylinders within the inventive motion simulation system through the use of an electrically controlled three-way valve associated with each hydraulic cylinder.

Electronic components are also used in the motion simulation system. A motion picture film passes through a projector in a conventional manner. Light from the projector passes through the film and casts an image through a projector lens and onto a screen. The motion picture film, in addition to containing visual images, also contains six soundtracks. The first five soundtracks provide a source of sound for speakers located throughout the theater. The remaining soundtrack contains a sync signal.

The sync signal from the sixth channel of the film passes through a pre-amplifier and then into a phased lock loop in order to produce a continuous stream of pulses which act as a start and sync pulses. This signal is fed into a latch and a D-to-A converter. The outputs of the D-to-A converter are fed to the inputs of four comparators, which, in turn, have their outputs connected to one of the three-way valves associated with a particular hydraulic cylinder. Each of the hydraulic cylinders contains a built-in feedback resistor which acts as a position sensor. The feedback resistor develops and electrical signal which is fed back to the various comparators.

In order to create the signals to control the various cylinders and thus move the seats in a realistic fashion in synchronization with the film, a joystick arrangement is employed. The arrangement consists of two joysticks, which are capable of movement in all directions with the movement being recorded for each joystick in two axes to develop four analog signals. The four analog signals are fed into an analog-to-digital converter which produces four parallel 8-bit digital words on a set of data lines which feed the data into four 16-K byte RAMs. In order to preserve the information, the RAMs are backed-up with a battery. The RAMs contain data lines connected to the latch.

The way in which the electronic system is prepared for use with a particular motion picture is as follows. During production, a motion picture is placed in the projector and projected onto a screen. A trained operator watches the film, which already contains sound, and controls the joysticks in order to create analog voltage signals that correspond with intended movements of the hydraulic cylinders that are attached to the mechanical structure for moving the various seats. These analog signals are converted to digital signals by the A/D converter and stored in the memory. In this way, the RAM memory contains digital representations of all of the movement signals associated with the motion simulation. These digital signals have been produced in synchronization with the film as the film has been projected.

In use in the theater setting, the pre-recorded film is placed in the projector and projected in a conventional manner toward the screen. As stated before, there are six sound channels with the first five channels to produce appropriate sound to go along with the image appearing on the screen. The sixth channel contains a sync pulse, which in a preferred embodiment, is 256 hertz. This sync pulse appears throughout the entire length of the sound channel and provides an input into the phased lock loop in order to produce a series of sync pulses for operating the latch and the D/A converter. The beginning of the sound on the sixth channel coincides with the beginning of the visual presentation on the screen. At the same time, the initial presence of the pulse activates the latch and the motion simulation begins.

It is thus an object of the present invention to provide an improved motion simulator which creates in the mind of the user a duplication of reality.

It is another object of the present invention to provide a motion simulator used in an entertainment or educational setting which accomplishes eight degrees of motion.

It is still another object of the present invention to provide a motion simulator where a participant experiences realistic motion cues.

It is yet another object of the present invention to provide a motion simulator employing a servo-controlled hydraulic system actuated by signals recorded in computer memory.

These and other objects will become apparent when viewed in light of the drawings and detailed description.

DETAILED DESCRIPTION OF THE PREFERRED EMBODIMENTS

Figure 1:
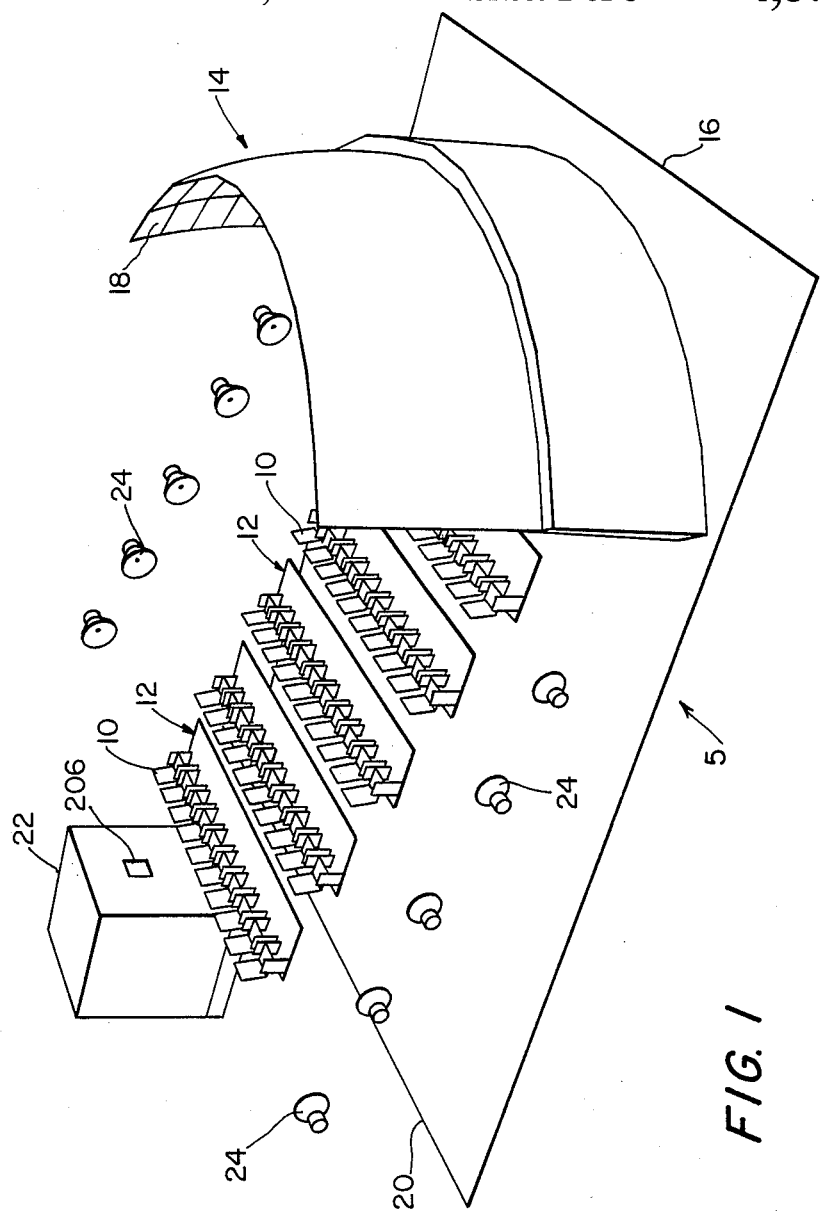
FIG. 1 is a schematic perspective view showing the organization of a theater employing the teachings of the present invention.
Figure 2:
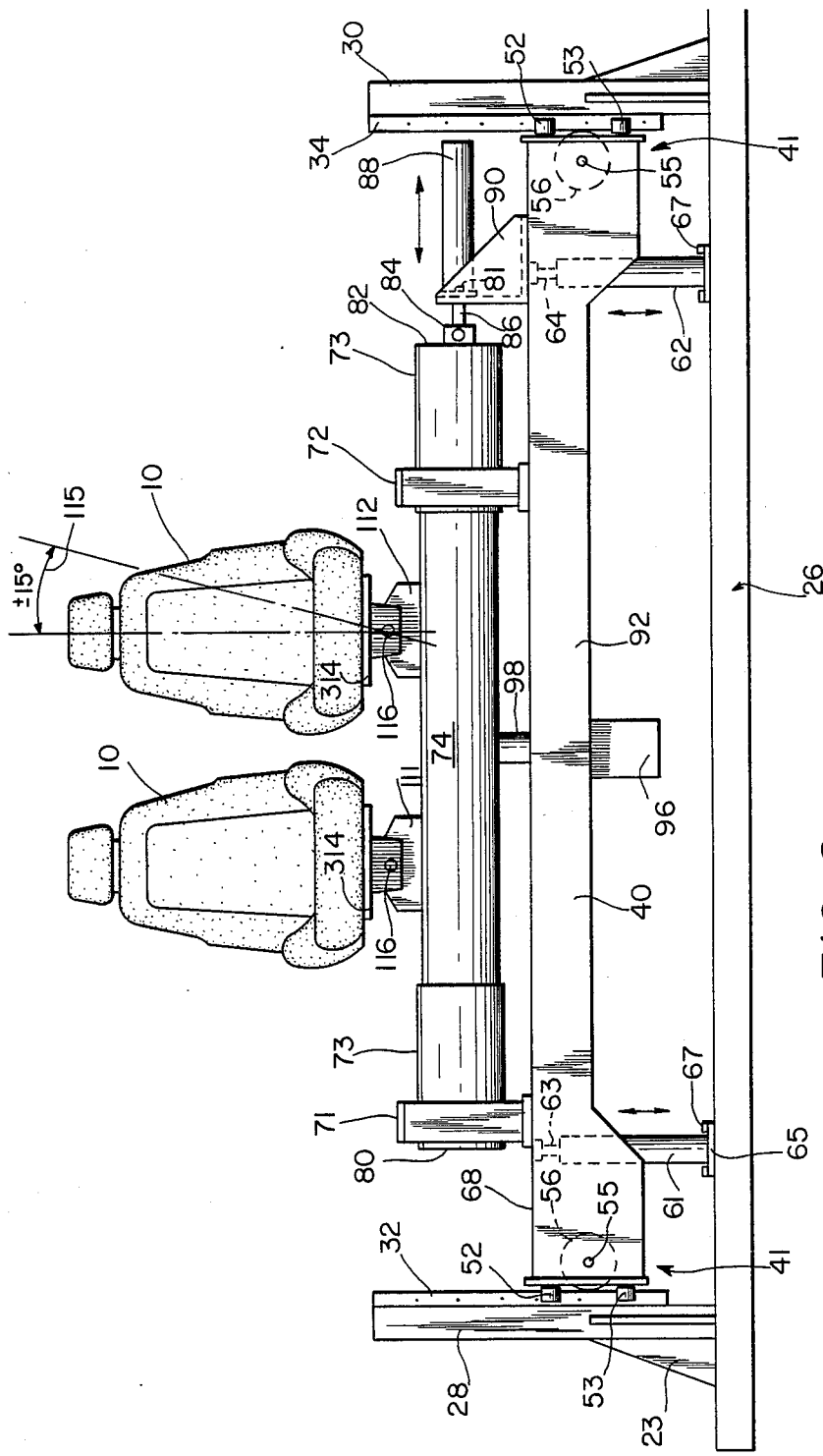
FIG. 2 is a front plan view of a two-seat version of the mechanical system according to the teachings of the present invention.

FIG. 1 is a schematic representation of a theater incorporating the teachings of the present invention. Basically, the theater comprises a plurality of seats 10 arranged in several rows. In a preferred embodiment of the invention, five elongated motion simulation platforms 12 are arranged one behind the other with their longitudinal axes generally parallel to each other. The platforms, which are at increasing heights as viewed from the front of the theater, each support ten seats. Other embodiments with as few as one or two seats are also contemplated. In the embodiment of FIG. 1, the seats are arranged so that each group of participants who occupy the seats has an uninterrupted view of a movie screen 14 located at the forward end 16 of the theater. In a preferred embodiment, the screen is made up of a plurality of perforated aluminum sections 18, joined together to form a spherical viewing surface. At the back end 20 of the theater is a projection booth 22 which houses a projection system for conventionally projecting a motion picture on the screen while at the same time initiating control of the movement of the seats 10. Positioned about the theater are several speakers 24 which receive their sound from the soundtracks of the motion picture. In a preferred embodiment, the projector has six soundtracks and five of them are used to power various speakers in order to simulate auditory reality. The sixth soundtrack is used to present a synchronization signal at the start of the motion picture in order to activate a servo-control system for causing the seats 10 to move in eight directions in accordance with the action taking place on the screen in order to create the illusion of reality in the mind of the participant or occupant of the seat.

The motion simulation system of the present invention is basically comprised of three coordinated components or sub-systems. The first sub-system consists of mechanical structure in the form of seats, rods, bearings and hydraulic cylinders in order to mechanically convey eight directions of motion to a participant occupying one of the seats. The second sub-system is found in a hydraulic circuit used to convert electrical signals from a digital control system into hydraulic motion signals for the mechanical system. Finally, the last component of the motion simulator is the electrical circuitry which incorporates a projector for projecting a moving image on the screen 14 coupled with appropriate analog and digital circuitry in order to produce a series of motion signals used to individually move the seats 10 in directions which would correspond to the motion taking place in the point-of-view film being displayed on the screen.

FIGS. 2 through 5 show the structural elements constituting the mechanical sub-system. The embodiment shown in the figures has two seats arranged side-by-side. It is to be understood that any number of seats may be used and the principles described are readily adaptable to any number of seats. The mechanical structure begins with a permanently secured base 26 which is arranged so that its longitudinal axis is substantially perpendicular to the axis drawn from the lens 205 of a projector 201 to the central portion of the viewing screen 14. Positioned at both ends of the base are vertically oriented base rails 28 and 30. Each of the base rails is fastened to the top surface 25 of base 26 in a secure manner such as by welding. Support wings 23 are also welded to each base rail and the top surface of the base to further support each base rail. Positioned on the inner exterior surface of each base rail is a vertically oriented guide rail 32 and 34. Each of the guide rails is arranged so that the longitudinal axis of a guide rail is substantially parallel with its associated base rail. The front and back side surfaces of each guide rail receive a nylon guide panel 36 and 38. The panels are secured to the guide rails by suitable fastening means such as screws 35.

Horizontally disposed between each vertically oriented base rail is an elongated platform 40. Each end of the platform terminates in a guide portion 41 that contains four outwardly projecting guide roller members 51 through 54 which are laid out so that two of the guide members 51 and 54 are in rolling contact with nylon guide panel 36 and the remaining two guide members 52 and 53 are in rolling contact with nylon guide panel 38. Positioned for rotation within the end guide is a vertically oriented wheel 56 rotatably mounted on horizontally disposed axis 55. The use of wheels 56 and roller members 51 through 54 at both ends of the platform insures smooth vertical motion of the platform in an up-and-down direction relative to the stationary base 26.

Positioned underneath and at both ends of the platform 40 are a pair of vertically oriented hydraulic cylinders 61 and 62. At the end of each cylinder is a flange portion 65. The flange is used to secure each cylinder to the surface 25 of base 26 by a suitable fastening means such as bolts 67. These cylinders are activated in unison so that their pistons 63 and 64, respectively, move the same vertical distance in order to precisely raise and lower the platform. The top of the platform defines an elongated planar surface 68 to which is secured in spaced relationship two vertically disposed bearing holders 71 and 72. The bearing holders are spaced from each other a sufficient distance to comfortably receive between them a predetermined number of seats. In the embodiment shown in FIG. 2, there are two seats located between the bearing holders. Held within each bearing holder is a split bearing 73. The bearing is of generally circular cross-section and movably receives an elongated main tube 74. In a preferred embodiment, the diameter of the main tube is approximately 8 inches and is positioned within the pair of bronze split bearings for free rotational and longitudinal motion.

The split bearings 73, which hold the 8 inch diameter main tube 74, are made of ultra high molecular weight material. This type of material has a low friction characteristic and is extremely durable.

Using the split bearings allows the bearing sleeve to be replaced easily. Bearing sleeves fit tightly around the main tube and slide in between the split bearings. The bearing sleeves are made of brass and are nickel/teflon impregnated to lengthen bearing life and lower the friction coefficient.

One end of the main tube terminates in an end plate 80 which completely closes off the tube. The other end of the main tube terminates in an axial end plate 82 that contains a coupling projection 84 to which is secured the piston end 86 of hydraulic cylinder 88. The flanged end of cylinder 88 is secured by a suitable fastening means such as bolts 81 to a gusset 90 that, in turn, is permanently secured as by welding to the upper surface 68 in such a way that the longitudinal axis of the piston and cylinder are co-terminus with the longitudinal axis of the main tube 74.

The platform 40 also includes a vertically oriented forward face 92 and a vertically oriented rearward face 94. Secured as by welding to the rearward face at a central location along the longitudinal axis of the platform is a vertically oriented gusset 96 which supports a hydraulic cylinder 98. The flanged end of the hydraulic cylinder is secured to gusset 96 in the same manner that cylinder 88 is secured to gusset 81. Secured as by welding to the outer surface of main tube 74 near its center are a pair of radially outwardly projecting rod holders 101 and 102 which are spaced a predetermined distance from each other. Each of the rod holders contains an aperture for receiving an elongated rod 104 which is generally parallel to the surface of the main tube and which is secured against movement in the holders 101 and 102 by a fastener such as a screw mounted flange and bearing assembly 103. Positioned between the holders 101 and 102 at a central location on the rod 104 is a coupling 106 which is free to pivot about rod 104. The free end of coupling 106 has an aperture which receives pivot pin 301 for movably securing the end 302 of pivot rod 108. The free end of coupling 106 contains another aperture which receives pivot pin 304 for securing one end of rod 306. The other end of rod 306 is secured to a boss 308 welded to surface 68 of platform 40. Rod 306 functions as a stabilizer against sideward motion of the coupling and piston. As the piston rod 108 moves in a generally vertical direction up-and-down, the tube 74 is caused to rotate about its longitudinal axis. In a preferred embodiment, the tube is able to rotate within a range of about ±25°.

Figure 3:
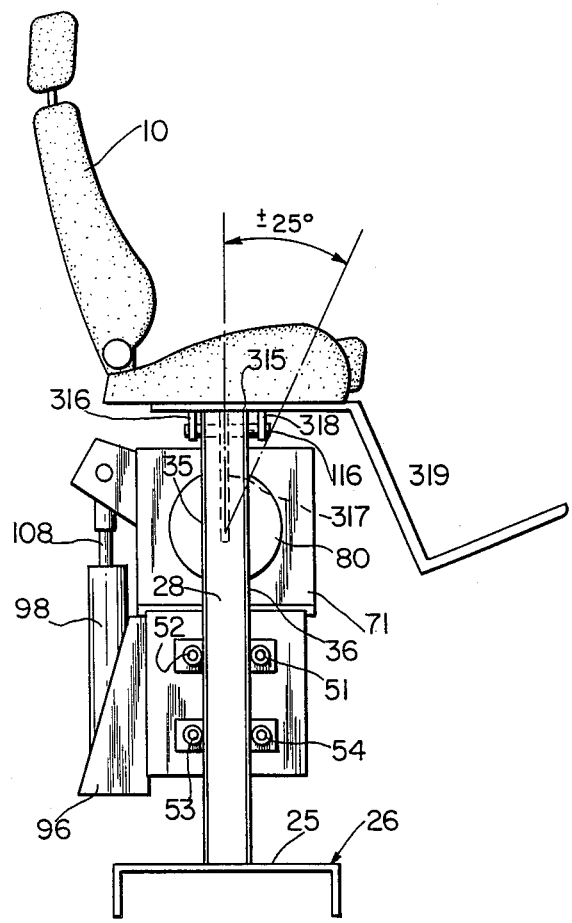
FIG. 3 is a side plan view of the embodiment of FIG. 2.
Figure 4:
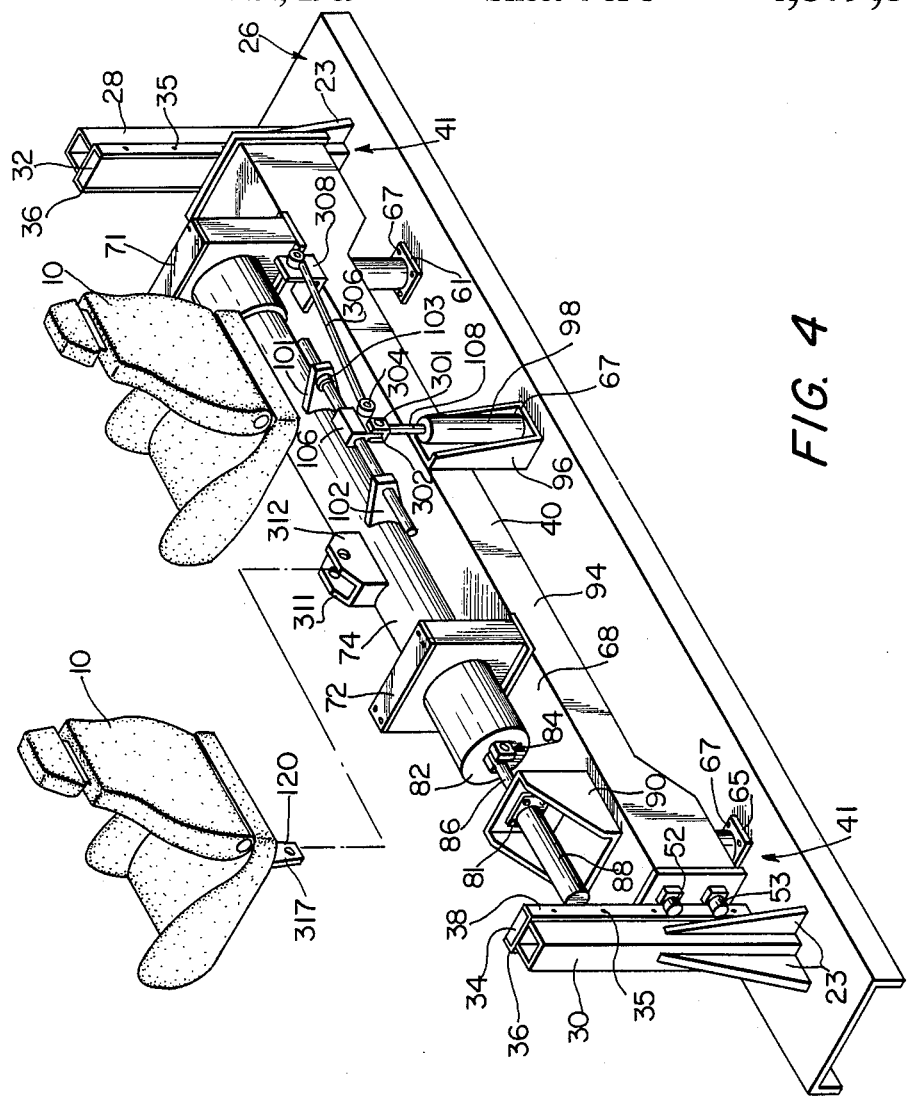
FIG. 4 is a rear perspective view of the embodiment of FIG. 2.
Figure 5:
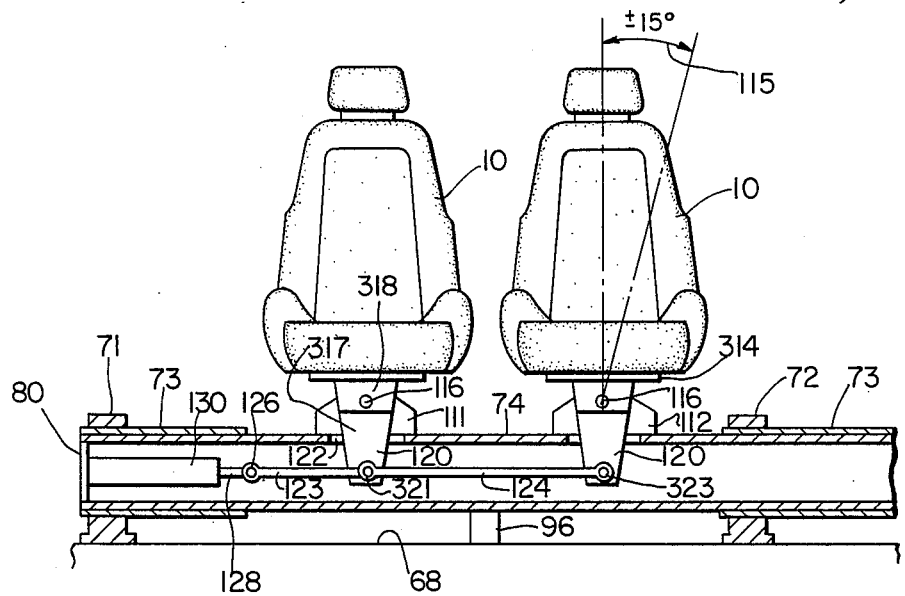
FIG. 5 is a front plan view partially cut away to reveal the interior of the main tube of the embodiment shown in FIG. 2.

With reference to FIG. 5, a pair of projections 111 and 112 emanate from the surface of main tube 74 in a axial direction. Each of the projections is made up of forward and rearward planar supports 311 and 312. These supports are disposed so that apertures defined in each support are arranged to mount a seat support base 314 in an orientation generally perpendicular to the surface of tube 74. Each seat support base includes three downwardly extending generally planar sections 316, 317 and 318 which each contain apertures for receiving a pin 116 in order to movably mount the seat base 314 to the supports 311 and 312 of each support 111 and 112. Each seat support base also includes a planar portion 315 to which the base of each seat 10 is secured. FIG. 3 also shows the use of foot rest 319 eminating from portion 315. The foot rest is there for both comfort and safety. An opening 122 is defined in main tube 74 between supports 311 and 312 to allow section 317 to extend into tube 74. The distal end of section 317 terminates in an aperture.

Secured to the closed end plate 80 within tube 74 is a longitudinally extending hydraulic cylinder 130 including movable piston 128. Secured to the end of piston 128 is a coupling 315 for movably connecting piston 128 to one end of a rod 123. The other end of rod 123 is mounted to the distal end of section 317 of seat base 314 by a pivot pin 321. The pin also pivotally couples one end of rod 124. The other end of rod 124 is mounted to the distal end of section 317 of seat base 314 of the next seat by a pivot pin 323. In this way, activation of the hydraulic cylinder 130 causes the piston to move in-and-out and thus displace the rods 123 and 124 in a longitudinal direction to-and-fro within the main tube. This motion is translated to the couplings with the member 314 and results in a side-to-side tilt motion of ±15° for each of the seats 10 as noted by arrow 115 in FIG. 2.

Figure 6:
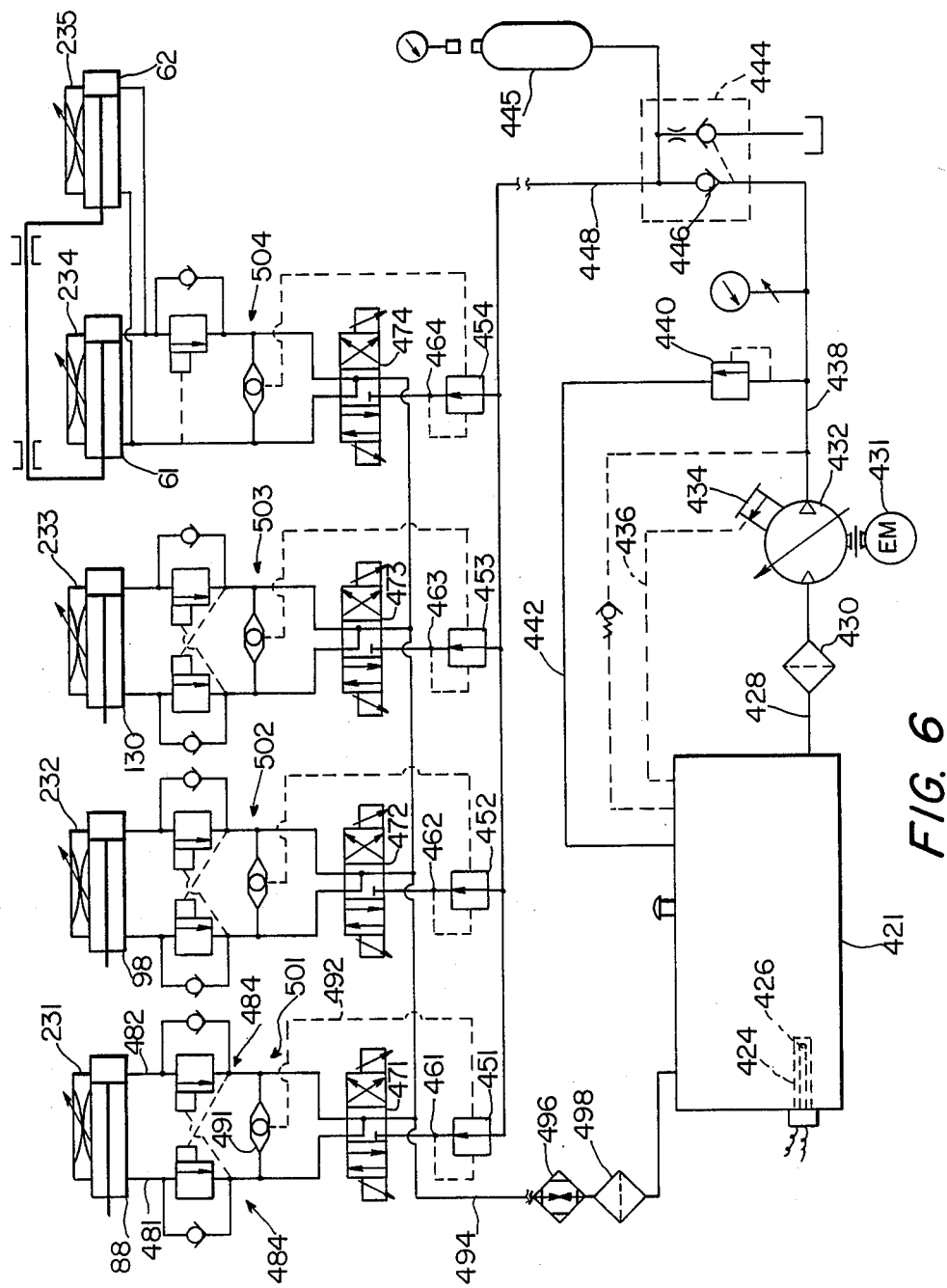
FIG. 6 is a schematic diagram showing the hydraulic circuit for the two-seat embodiment of FIG. 2.

FIG. 6 shows in schematic form the hydraulic circuit used to power the various hydraulic cylinders within the inventive motion simulation system.

A tank 421 holds a predetermined quantity of hydraulic fluid which is used by the system. One such tank is included in a power unit manufactured by Vickers and bearing Product No. T60VB20-C. Positioned within the tank is a conventional bulb well 424 within which is positioned a temperature probe 426 for measuring the temperature of the hydraulic fluid. One such bulb well is made by Vickers and bears Product No. OCBW-2-20. A conduit 428 extends from the bottom of the tank to a motor 430 which drives a pump 432. A suitable pump is made by Vickers and bears Product No. PVB20-FRS-20-C. In a preferred embodiment, the pump is driven at a speed sufficient to pump 20 gallons of hydraulic fluid per minute. Motor 431 is provided to cool the pump.

A safety valve 434 is defined in the pump to allow the passage of hydraulic fluid back to the tank through a feedback line 436 in the event that the psi of the pump exceeds approximately 1500. The output of the pump travels through conduit 438. If the pressure within line 438 exceeds 1500 psi then a portion of hydraulic fluid passes from conduit 438 through a conventional relief valve 440, such as Vickers No. CT06-0-50, and a feedback loop 442 back into tank 421 in order to reduce the pressure within line 438 to 1500 psi. Conduit 438 terminates at a conventional manifold 444, such as one made by Sun under Model No. YCHE-XAN-AM, and having a check valve 446. The manifold is also in circuit with an accumulator 445 that is pre-charged to 1000 psi. Conduit 448 emerging from manifold 444 passes the fluid to four conventional pressure compensation devices 451 through 454. These devices are used to maintain an even pressure within all of the lines. Conduits 461 through 464 emerge respectively from each of the pressure compensators 451 through 454, such as those sold by Sun under Product Nos. YFCG-LDN-AA and YFCG-XHN-AA, and are each connected to the input of a three-way electrical valve 471 through 474, such as those sold by Vickers under Product No. KDG4-V3-33C-155-M-W-G-40. Each of the electrical valves contains a pair of outputs. Using valve 471 and its associated circuit 501 as exemplary, each of the outputs 481 and 482 is connected to a conventional counter-balance valve 484. Examples of suitable counterbalance valves are those sold by Sun and bearing Product Nos. CBCA-L1N-EBY and CBCA-L1 N-EBA. The output of each counter-balance valve is connected to one end of a hydraulic cylinder. In the case of the example being described, lines 481 and 482, after they emerge from the counter-balance valve, are connected to respective ends of hydraulic cylinder 88 which accomplishes the lateral left-right movement of the main tube 74. A conventional pilot cylinder 491 is provided between lines 481 and 482 downstream of the counter-balance valves in order to sense the pressure across both lines and, through a feedback line 492, adjust the pressure compensator 451 so as to maintain equal pressure within lines 481 and 482 in conjunction with the feedback line 494 back to the tank 421 after passing through a heat exchanger 496 and a return line filter 498. Circuits 502 through 504 are functionally the same as circuit 501. Circuit 502 operates cylinder 98 which accomplishes the forward and backward motion of the seats. Circuit 503 operates cylinder 130 which causes the tilt or banking motion of the seats 10. Circuit 504 simultaneously operates cylinders 61 and 62 which creates the up-and-down motion of platform 40.

Figure 7:
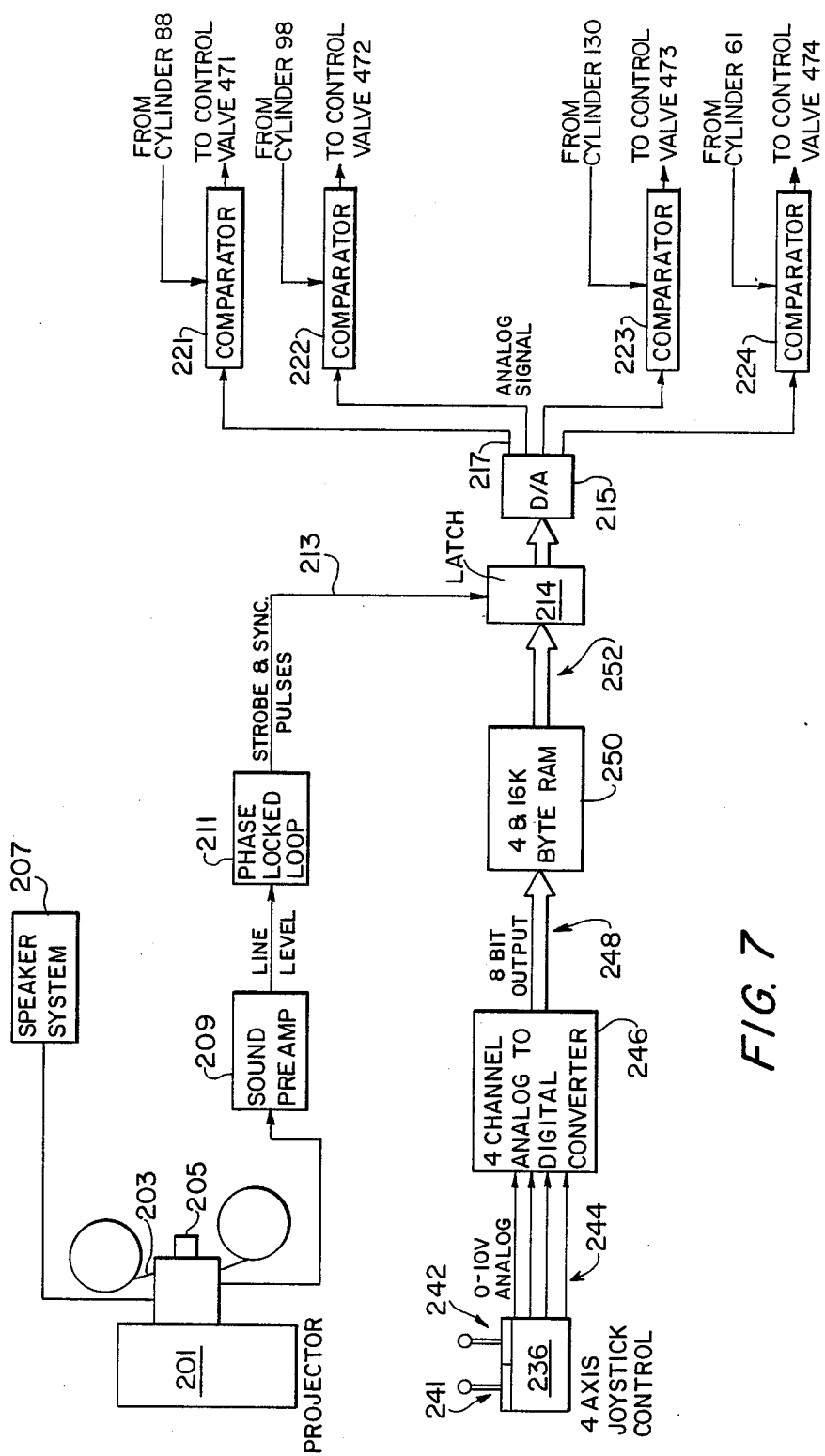
FIG. 7 is a schematic block diagram showing the electronic system for use with the embodiment of FIG. 2.

FIG. 7 is a schematic diagram of the electronic components used in the motion simulation system. A projector 201 is housed within the projection booth 22 of the theater shown in FIG. 1. In a preferred embodiment, the projector accepts 70 mm film and has a 5-perforation vertical pulldown. In addition, the projector operates at 30 frames per second. A motion picture film 203 passes through the projector in a conventional manner. Light from the projector passes through the film and casts an image through projector lens 205, out the projection window 206 of the projection booth 22 and onto the screen 14. The motion picture film, in addition to containing visual images, also contains six soundtracks. The first five soundtracks provide a source of sound for the speakers 24 located throughout the theater. The remaining soundtrack contains a start signal for use in a manner to be described hereinafter.

The sound signal from the sixth channel of the film passes through a pre-amplifier 209 and then into a phased lock loop 211 in order to produce a continuous stream of pulses which act as a strobe and sync pulses on lines 213. This signal is fed into a latch 214 and D-to-A converter 215. The output of the D-to-A converter appears on lines 217. Each of these lines has an input to comparators 221 through 224. Each of the comparators has an output connected to one of the three-way valves. The output of comparator 221 is connected to the electronic control of valve 471. In turn, comparator 222 is connected to valve 472, comparator 223 is connected to valve 473 and comparator 224 is connected to valve 474. Each of the hydraulic cylinders contains a built-in feedback resistor which acts as a position sensor. The feedback resistor develops and electrical signal which is fed back to one of the inputs of an associated comparator. The electrical signal is representative of the position of the piston within the cylinder. The resistor 231 from cylinder 88 is fed back to comparator 221. In turn, resistor 232 creates a feedback signal to comparator 222. Resistor 233, associated with cylinder 130, creates a feedback signal to comparator 223 and the resistor in either cylinder 61 or 62 creates a feedback signal to comparator 224. These feedback signals are used as a reference to note the position of each of the cylinders and then to cause the comparator to issue the appropriate signal to move the piston associated with the effected cylinder either into or out of the cylinder.

In order to create the signals to control the various cylinders and thus move the seats in a realistic fashion in synchronization with the film, a joystick arrangement 236 is employed. The arrangement consists of two joysticks 241 and 242, which are capable of movement in all directions with the movement being recorded for each joystick in two axes to develop four analog signals on lines 244. Depending on the positioning of each joystick, each of the four lines 244 contains an analog signal that has a voltage range of 0 to 10 volts. The four analog signals are fed into an analog-to-digital converter 246 which produces four parallel 8-bit digital words on lines 248. Each of the digital words corresponds to one of the four analog signals. Because 8-bit words are selected, a component of an analog signal derived from the joysticks can assume up to 256 values (i.e., between 0 and 255). These values are fed into and stored in serial fashion in four 16-K byte RAMs. In order to preserve the information, the RAMs are backed-up with a battery (not shown). The RAMs contain data lines 252 connected to latch 214.

With reference to FIG. 7, the way in which the electronic system is prepared for use with a particular motion picture is as follows. During production, a motion picture is placed in projector 201 and projected onto a screen. This film is what is known as a point-of-view film meaning that the film is shot from the perspective of the viewer. A trained operator watches the film, which already contains sound, and controls the joysticks 236 in order to create analog voltage signals on lines 244 that correspond with intended movements of the hydraulic cylinders that are attached to the mechanical structure for moving the various seats. These analog signals are converted to digital signals by A/D converter 246 and stored in memory 250. In this way, the RAM memory 250 contains digital representations of all of the movement signals associated with the motion simulation. These digital signals have been produced in synchronization with the film as the film has been projected.

The digital information stored in the RAM 250 may also be stored permanently in a read-only memory (ROM) so that the ultimate user receives not only a film but also a ROM for use with that film.

In use in the theater setting, the pre-recorded film 203 is placed in projector 201 and projected in a conventional manner toward the screen 14. As stated before, there are six sound channels with the first five channels to produce appropriate sound to go along with the image appearing on the screen. The sixth channel contains a sync pulse, which in a preferred embodiment, is 256 hertz. This sync pulse appears throughout the entire length of the sound channel and provides an input into phased lock loop 211 in order to produce a series of sync pulses for operating the latch and D/A converter. The beginning of the sound on the sixth channel coincides with the beginning of the visual presentation on the screen. At the same time, the initial presence of the pulse activates the latch and the motion simulation begins.

Thus, the motion simulation system of the present invention is a motion generating device that is to be used at high traffic locations such as exhibitions, world's fairs, trade conventions, theme parks and science museums. Participants sitting in the various seats that constitute part of the system experience eight directions of movement as they watch a point-of-view film shown on a large screen in the shape of a spherical sector. The motions experienced are up/down, side-to-side, tilt side-to-side and rocking back-and-forth. This combination of motions is accomplished by using the servo-controlled hydraulic cylinders actuated by the signals recorded in the memory 250.

In a preferred embodiment, the hydraulic cylinders allow the platform 40 to move ±6 inches of up-and-down motion. Hydraulic cylinder 88 provides for ±6 inches of side-to-side motion. The hydraulic cylinder 98 provides for ±25° of forward and backward rocking motion, and, finally, hydraulic cylinder 130 provides ±15° of left and right tilt motion. All of these motions are experienced simultaneously to further enhance the illusion of reality.

Figure 9:
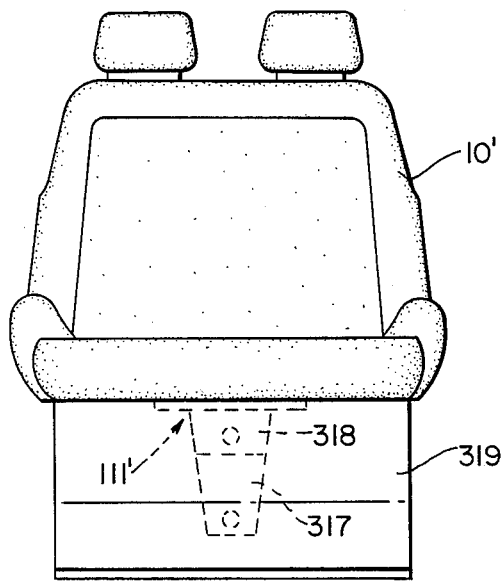
FIG. 9 is a front plan view showing an alternative seat which is capable of holding two passengers.
Figure 8:
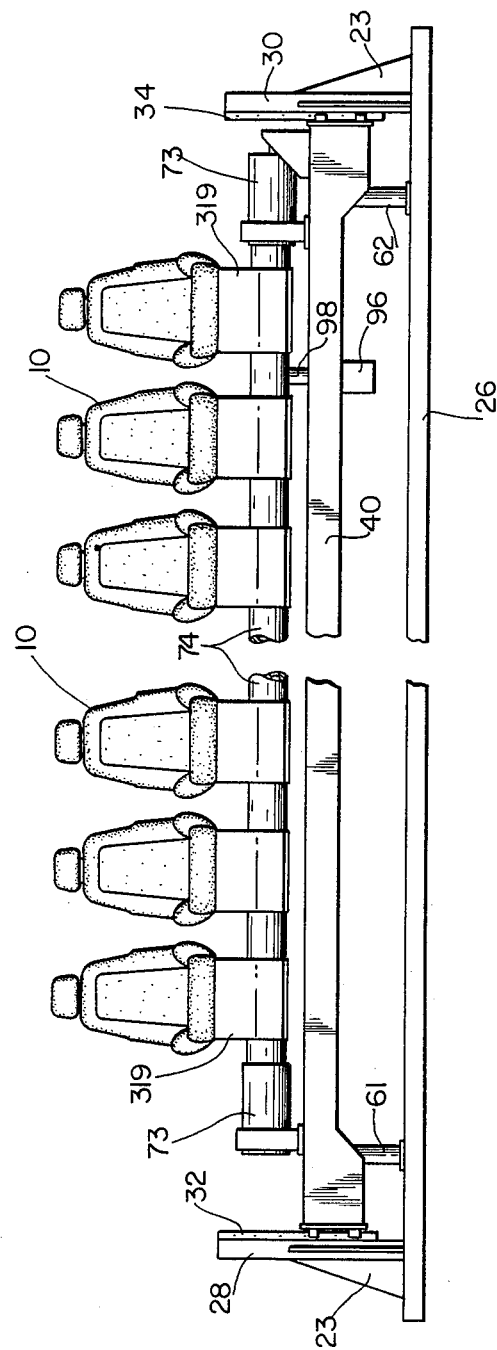
FIG. 8 is a front plan view partially cut away to show embodiments having more than two seats.

Many changes and modifications in the above embodiments of the invention can be made without departing from the scope of the invention. For example, it is contemplated that the main tube, because of its strength, may support at least as many as ten seats. See, for example, FIG. 8. The signal seats of the various embodiment may be replaced by a dual-capacity seat such as that shown in FIG. 9. It is also contemplated that the side-to-side cylinders might also be located within the main tube. Accordingly, the scope is intended to be limited only by the appended claims.

What is claimed is:

1. A motion simulation system comprising:
    a theater having a seating area, a viewing area and a projection area;
    means for projecting a moving image from said projection area to said viewing area;
    a stationary base positioned within said seating area;
    a plurality of adjacent seats movably positioned on said stationary base between said projecting and viewing areas;
    moving means for controllably moving said seats in a plurality of directions of movement relative to said stationary base, all of said seats during the entire operation of said motion simulation system moving at the same time, in the same pattern, and being displaced from said base by the same amount, said directions of movement for each of said seats including up-and-down, side-to-side, tilt side-to-side and rotation forward-and-back, and
    electronic circuit means for controlling said hydraulic moving means to synchronize the movements of said seats with the images being projected on said viewing area.

2. The motion simulation system of claim 1, wherein said hydraulic moving means comprises:
    a platform movably mounted to said stationary base;
    first moving means for moving said platform relative to said stationary base;
    an elongated support;
    means for movably mounting said support to said platform;
    second moving means mounted to said platform for causing said support to move bidirectionally along the longitudinal axis of said platform;
    third moving means secured to said platform for causing said support to turn on its longitudinal axis within a predetermined number of degrees;
    means for movably mounting said seats to and
    fourth moving means secured to said support said seats to tilt in a side-to-side motion with a predetermined number of degrees; and
    control means including a pre-arranged program of control signals for causing said first, second, third and fourth moving means to operate, the operation of said several moving means causing said seats to move in one or more directions at a given moment in time.

3. The motion simulation system of claim 2, further comprising a pair of spaced guide members secured to said stationary base and means secured to said platform for guiding the movement of said platform along said members.

4. The motion simulation system of claim 2, wherein said elongated support is an elongated tubular member.

5. The motion simulation system of claim 2, wherein said first, second, third and fourth moving means each comprises a hydraulic piston cylinder and said control means comprises hydraulic circuit means operatively connected to each hydraulic cylinder and an electronic circuit means for controlling said hydraulic circuit means.

6. The motion simulation system of claim 5, wherein said hydraulic circuit means includes a plurality of electronic valves to control the path of hydraulic fluid to each of said hydraulic cylinders for moving the pistons within each cylinder, each of said electronic valves being responsive to control signals developed by said electronic circuit means.

7. The motion simulation system of claim 6, wherein said electronic circuit means comprises:
    memory means for storing a plurality of said control signals in a pre-arranged order; and means for reading said control signals from said memory means and delivering said control signals to said electronic valves in said pre-arranged order.

8. A motion simulation system for moving a seat containing a participant in a number of coordinated directions, said system comprising:
- a stationary base;
- a platform movably mounted to said base;
- first moving means for moving said platform relative to said stationary base;
- an elongated support;
- means for movably mounting said support to said platform;
- second moving means mounted to said platform for causing said support to move bidirectionally along the longitudinally axis of said platform;
- third moving means secured to said platform for causing said support to turn on its longitudinal axis within a predetermined number of degrees;
- a seat adapted to receive a participant;
- means for movably mounting said seat to said support;
- fourth moving means secured to said support for causing said seat to tilt in a side-to-side motion within a predetermined number of degrees; and
- control means including a pre-arranged program of control signals for causing said first, second, third and fourth moving means to operate, the operation of said several moving means causing said seat to move in one or more directions at a given moment in time.

9. The motion simulation system of claim 8, furhter comprising a pair of spaced guide members secured to said base and means secured to said platform for guiding the movement of said platform along said members.

10. The motion simulation system of claim 8, wherein said elongated support is an elongated tubular member.

11. The motion simulator system of claim 8, wherein said first, second, third and fourth moving means each comprises a hydraulic piston cylinder and said control means comprises hydraulic circuit means operatively connected to each hydraulic cylinder and an electronic circuit means for controlling said hydraulic circuit means.

12. The motion simulation system of claim 11, wherein said hydraulic circuit means includes a plurality of electronic valves to control the path of hydraulic fluid to each of said hydraulic cylinders for moving the pistons within each cylinder, each of said electronic valves being responsive to control signals developed by said electronic circuit means.

13. The motion simulation system of claim 12, wherein said electronic circuit means comprises:
- memory means for storing a plurality of said control signals in a pre-arranged order; and
- means for reading said control signals from said memory means and delivering said control signals to said electronic valves in said pre-arranged order.

14. The motion simulation system of claim 13, wherein said memory means in a digital memory and the signals stored in said memory are in digital form and wherein said reading and delivering means comprises:
- digital-to-analog converter means;
- latch means for conveying the digital control signals from said memory to said digital-to-analog converter means;
- position sensing means for detecting the positions of said hydraulic cylinders and developing an electrical signals representative of said positions; and
- comparator means having first and second input means, said first input means receiving the analog signals from said digital-to-analog converter, said second input means receiving the signals from said position sensing means and said comparator using said position signals as a reference to produce said control signals for controlling said hydraulic cylinders.

15. A motion simulation system comprising:
- a theater having a seating area, a viewing area and a projection area;
- means for projecting a moving image from said projection area to said viewing area;
- a stationary base positioned within said seating area;
- a platform movably mounted to said stationary base;
- a plurality of adjacent seats movably mounted on said platform between said projecting and viewing areas;
- moving means for controllably moving said seats in a plurality of directions of movement relative to said stationary base, each of said seats moving at the same time, in the same pattern, and by the same amount, said directions of movement for each of said seats including up-and-down, side-to-side and rotation forward-and-back, each of said seats being capable of moving tilt side-by-side relative to said platform; and
- electronic circuit means for controlling said moving means to synchronize the movements of said seats with the images being projected on said viewing area.

* * * * *